F. C. HEYWOOD.
APPARATUS FOR STIRRING AND SUPPLYING COLOR TO PAPER COATING MACHINES.
APPLICATION FILED DEC. 27, 1913.
1,164,812.  
Patented Dec. 21, 1915.
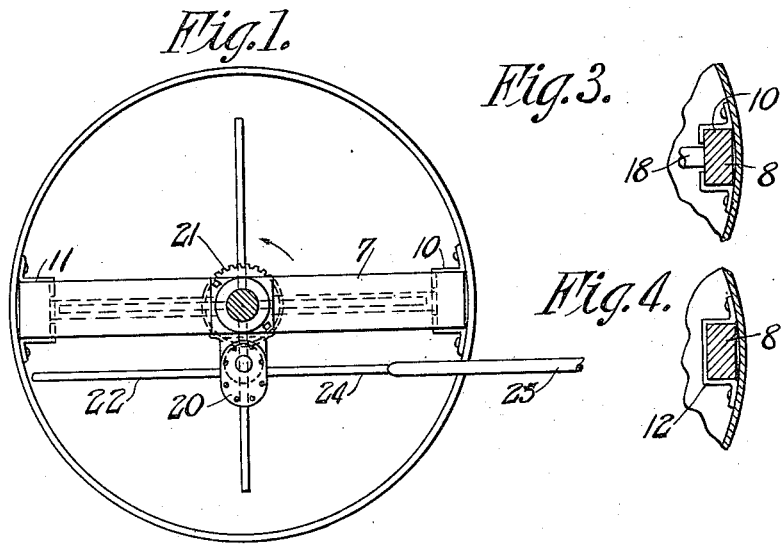
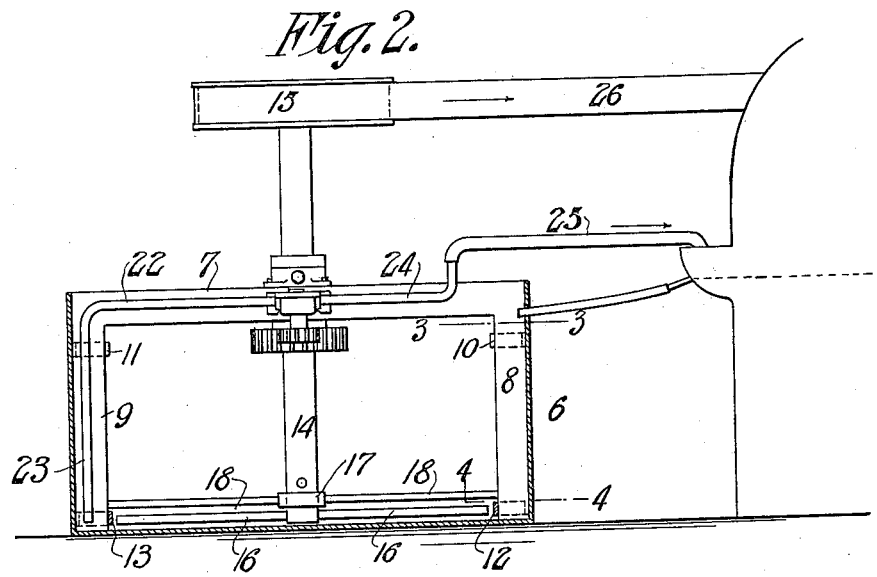
WITNESSES:  
W. P. Noble  
P. M. Mowry
INVENTOR.  
Francis C. Heywood,  
BY  
ATTORNEY.
COLUMBIA PLANOGRAPH CO., WASHINGTON, D. C.

UNITED STATES PATENT OFFICE.

FRANCIS C. HEYWOOD, OF HOLYOKE, MASSACHUSETTS, ASSIGNOR TO WHITMORE MANUFACTURING COMPANY, OF HOLYOKE, MASSACHUSETTS, A CORPORATION OF MASSACHUSETTS.

APPARATUS FOR STIRRING AND SUPPLYING COLOR TO PAPER-COATING MACHINES.

1,164,812.

Specification of Letters Patent.  Patented Dec. 21, 1915.

Application filed December 27, 1913.  Serial No. 808,933.

*To all whom it may concern:*

Be it known that I, FRANCIS C. HEYWOOD, a citizen of the United States of America, and resident of Holyoke, in the county of Hampden and State of Massachusetts, have invented certain new and useful Improvements in Apparatus for Stirring and Supplying Color to Paper-Coating Machines, of which the following is a full, clear, and exact description.

The object of this invention is to provide an improved form of device for the purpose of agitating or stirring coloring material, particularly that used for paper coating machines; and which apparatus can be almost entirely removed from a tank or container by simply lifting it out of the vessel; and which apparatus that is removable, also includes a pumping device operated simultaneously with the agitating means, and preferably by the same driving member, whereby the material can continuously flow into the vessel, be stirred or mixed in a thorough manner, and thereupon pumped out of the vessel to the place where it is desired to be used.

In the accompanying drawings, illustrating one embodiment of my invention, Figure 1 is a plan view of the apparatus. Fig. 2 is a sectional elevation of Fig. 1. Fig. 3 is a fragmentary horizontal section on the line 3—3, Fig. 2, and Fig. 4 is a similar view on the line 4—4, of Fig. 2.

As shown in the drawing, a tank 6 of drum shape is provided on two opposite sides with suitable guides; and I provide a horizontal bar 7 having depending arms 8 and 9 extending downward at each end thereof, adapted to slide vertically in the guide members in the sides of the tank; two open guides in the form of loops 10 and 11 are arranged near the upper portion of the tank, while vertically below the same I arrange closed loops 12 and 13, these loops being of a size to receive the arms 8 and 9. On the cross bar 7 is supported a vertical shaft in suitable bearing, a shaft 14 being shown having a pulley 15 on its upper end, with its lower end provided with arms 16 that rotate in the tank 6 near its bottom. A sleeve or bearing 17 for the shaft 14 is supported by cross arms 18, secured to the vertical arms 8 and 9; and the upper guide loops 10 have an opening permitting the passage of these arms 18 as indicated in Fig. 3. It will thus be seen that the frame composed of the cross bar 7 with the two arms 8 and 9 at its extremities serve to carry the agitating means, and that the same can be lifted bodily out of the tank and replaced when desired. This bar 7 also serves to support a suitable pump for the purpose of pumping the coloring material or other contents of the tank out of the same after it has been suitably stirred. A pump of the rotary form indicated generally by 20 is secured at, and supported by, one side of the bar 7 near the shaft and may be rotated by means of a gear 21 on the shaft 14, meshing with the pump driving gear 30 so that the pump is operating while the agitating members are being driven. An inlet conduit 22 for the pump extends across the bar 7 and then down by bent portion 23 attached to the upright arm 9 with its opened end adjacent the bottom of the tank; while the outlet conduit 24 of the pump is shown as extending in the opposite direction, to supply the material to any desired place where it is to be used, as for instance a paper glazing machine, partially represented at the right hand portion of Fig. 2. The outlet 24 may have a removable connection with a pipe 25, to be readily disconnected, whereby when the cross bar 7 is raised out of the tank, it will remove all of the agitating apparatus, and also the pumping means entirely from the tank, both of which instrumentalities are actuated from the belt pulley 15, by a suitable belt 26, if desired.

I claim:—

1. A device of the character described comprising a tank, a set of guides at opposite sides of the tank, a frame comprising a bar having depending members at each end thereof, that are adapted to be inserted in the said guides of the tank to support the bar extending across the top of the tank, a shaft supported in bearings on the bar to rotate on a vertical axis at the middle of the tank, and having substantially radial arms on its lower end to agitate the contents of the tank when the shaft is rotated, a member at the top of the shaft above said bar for rotating the shaft, and a pump supported by said frame, operable by the shaft having an inlet pipe immersed in the tank and having an outlet pipe for supplying a paper coating machine.

2. A device of the character described, comprising a tank, a pair of open loop guides one at each of opposite sides of the tank near the top, a pair of closed loop guides at said opposite sides near the bottom of the tank and alining with said guides respectively, a frame comprising a horizontal upper bar and depending arms at its opposite ends that are adapted to be inserted respectively in the said pairs of guides to support the bar extending across the top of the tank, a shaft supported in bearings carried by the frame to rotate in the vertical axis of the tank, arms on the lower end of the shaft to agitate the contents of the tank, a member on the shaft above the bar to rotate it, and a pump driven by the shaft, having an inlet conduit communicating with the tank, and having an outlet delivery conduit extending to a paper coating machine.

Signed by me at Holyoke, Mass., in presence of two subscribing witnesses.

FRANCIS C. HEYWOOD.

Witnesses:
FRANCIS D. HEYWOOD,
CHAS. D. COLSON.

Copies of this patent may be obtained for five cents each, by addressing the "Commissioner of Patents, Washington, D. C."